US008627759B2

(12) United States Patent
Wasmuht et al.

(10) Patent No.: US 8,627,759 B2
(45) Date of Patent: Jan. 14, 2014

(54) WHIRLPOOL

(75) Inventors: Klaus-Karl Wasmuht, Ellingen (DE);
Reinhard Pritscher, Ergoldrug (DE);
Helmut Kammerloher, Freising (DE);
Kurt Stippler, Marzling (DE)

(73) Assignee: Krones AG, Neutraubling (DE)

( * ) Notice: Subject to any disclaimer, the term of this patent is extended or adjusted under 35 U.S.C. 154(b) by 849 days.

(21) Appl. No.: 12/162,267

(22) PCT Filed: Oct. 20, 2006

(86) PCT No.: PCT/EP2006/010154
§ 371 (c)(1),
(2), (4) Date: Feb. 13, 2009

(87) PCT Pub. No.: WO2007/085279
PCT Pub. Date: Aug. 2, 2007

(65) Prior Publication Data
US 2009/0311372 A1 Dec. 17, 2009

(30) Foreign Application Priority Data
Jan. 27, 2006 (EP) .................................... 06001716

(51) Int. Cl.
*C12C 7/14* (2006.01)
*C12C 7/00* (2006.01)

(52) U.S. Cl.
USPC ............................................. 99/278; 428/16

(58) Field of Classification Search
USPC ................... 99/276, 277, 278; 426/495, 489;
210/521, 532.1, 538
See application file for complete search history.

(56) References Cited

U.S. PATENT DOCUMENTS

| 4,145,287 A * | 3/1979 | Walker et al. ................. 210/104 |
| 4,836,097 A * | 6/1989 | Tretter ......................... 99/277.1 |
| 4,945,823 A | 8/1990 | Widhopf |
| 5,759,415 A * | 6/1998 | Adams .......................... 210/776 |
| 6,968,773 B1 * | 11/2005 | Stippler et al. ................... 99/278 |
| 7,735,413 B2 * | 6/2010 | Wasmuht et al. ............... 99/278 |
| 2003/0044500 A1 | 3/2003 | Seldeslachts |
| 2004/0055950 A1 * | 3/2004 | Bryant .......................... 210/521 |

FOREIGN PATENT DOCUMENTS

| DE | 3506080 A * | 8/1986 |
| DE | 29713679 U | 2/1999 |
| DE | 20201680 U1 * | 4/2002 |
| EP | 1469062 A1 * | 10/2004 |
| JP | 2002-306151 | 10/2002 |
| WO | WO 97/15654 | 5/1997 |

OTHER PUBLICATIONS (D. Seldeslachts et al., BrewingScience—Monatsschrift für Brauwissenschaft <Monthly Publication on the Science of Brewing>, Issue 3/4, 1997, p. 76 and PCT WO 97/15654).
Ludwig Narziβ "Abriss der Bierbrauerei <Outline of Beer Brewing>", 5th edition, Ferdinand Enkel Verlag, Stuttgart, 1986, p. 319).
International Search Report based on PCT/EP2006/010154; filed Oct. 20, 2006.
(D. Seldeslachts et al., BrewingScience—Monatsschrift fur Brauwissenschaft <Monthly Publication on the Science of Brewing>, Issue 3/4, 1997, p. 76 and PCT WO 97/15654).

(Continued)

*Primary Examiner* — Jianying Atkisson
(74) *Attorney, Agent, or Firm* — Marshall, Gerstein & Borun LLP

(57) ABSTRACT

A whirlpool with an inner chamber for hot break separation by means of the whirlpool effect. In order to remove undesired volatile substances from the wort in a simple manner, the whirlpool comprises an integrated stripper, which has an outer chamber arranged around the inner chamber, for evaporating undesired volatile substances from the wort that has been transferred from the inner chamber.

7 Claims, 5 Drawing Sheets

(56) References Cited

OTHER PUBLICATIONS

Ludwig Narziβ "Abriss der Bierbrauerei <Outline of Beer Brewing>", 5th edition, Ferdinand Enkel Verlag, Stuttgart, 1986, p. 319).

"Wort Production", Chap. 3, p. 171, Technology Brewing and Malting, Int'l Ed., Wolfgang Kunze, 1999.
Kunze, Technology Brewing and Malting, 2nd Edition, VLB (1999), pp. 171 and 292-297.

* cited by examiner

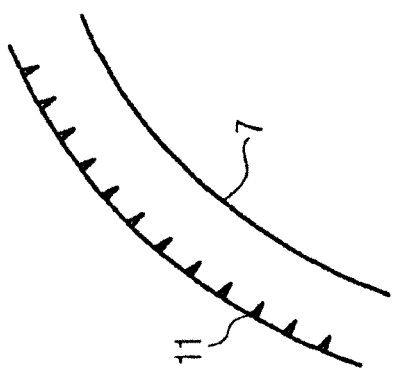
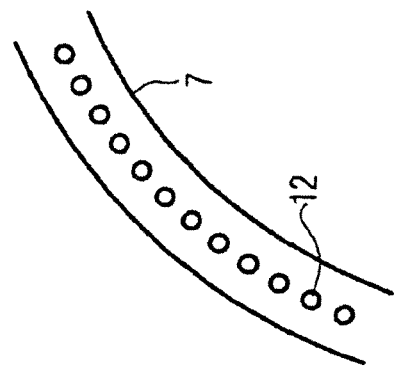
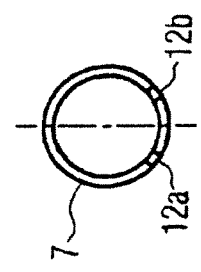

WHIRLPOOL

CROSS-REFERENCE DEVICE FOR AGRICULTURAL APPLIANCES

The present application claims the benefit of priority of the International Patent Application No. PCT/EP2006/010154; filed on Oct. 20, 2006. The entire text of the priority application is incorporated herein by reference in its entirety.

FIELD OF THE DISCLOSURE

The disclosure relates to a whirlpool as are used in brewing operations, such as in the brewhouse process after the wort copper for hot break separation.

BACKGROUND

Whirlpools used in brewing operations are known in the art, see Ludwig Narziβ "Abriss der Bierbrauerei <Outline of Beer Brewing>", 5th edition, Ferdinand Enkel Verlag, Stuttgart, 1986, page 319). During the preparation of the wort in beer brewing, aroma substances arise that can give the beer an unwanted smell or taste. One example of such an unwanted substance is dimethyl sulphide, which arises during the heating or boiling from an inactive precursor substance that is contained in malt. Dimethyl sulphide, also referred to as DMS in the following, itself is only present in the malt in small quantities. During the boiling process in the wort copper, the inactive precursor is cleaved into DMS and an active precursor. During the boiling process in the wort copper or the heating process in the mashing containers, the DMS is only partially distilled off. The active precursor is metabolised by the yeast that is present and converted into DMS. After the boiling process in the wort copper, there is consequently still DMS present in the wort. The boiled wort furthermore still contains other unwanted volatile substances, base aromatic substances, such as carbonyl, compounds containing sulphur, and the like.

Following the wort copper is, as previously explained, the whirlpool, for separating the hot break. The wort is kept hot in the whirlpool. Unwanted volatile substances develop here. In the finished beer, these substances lead to unwanted aromas and impair the stability of the taste. DMS, for example, in turn arises from the inactive precursor substance during the whirlpool's action period.

In order also to remove the remaining unwanted volatile substances from the wont, a so-called "wort-stripping" process has already been suggested (D. Seldeslachts et al., BrewingScience—Monatsschrift für Brauwissenschaft <Monthly Publication on the Science of Brewing>, issue 3/4, 1997, page 76 and PCT WO 97/15654). In such a wort-stripping process, the wort is directed through a wont-stripping column with an open packing. Steam takes away a part of the unwanted volatile substances, drawing them off through an exhaust gas line.

The construction and cleaning of such a device is complicated and costly, however.

In the German utility model no. 29713679.8, it has already been suggested that these unwanted volatile substances be driven out with the help of a device having at least one baffle shield that divents the wort that is being transferred. Such a device is also complicated and costly.

SUMMARY OF THE DISCLOSURE

It is an aspect of the present disclosure to provide a device and a method that allow, in a simple manner, unwanted volatile substances, such as DMS, for example, to be removed from the wort in a simple and economical manner.

According to the present disclosure, a whirlpool with integrated stripper is provided, wherein an inner chamber serves to separate hot break by means of a whirlpool effect and an outer chamber, which is arranged around the inner chamber, serves as the stripper in order to evaporate off the unwanted volatile substances from wort transferred from the inner chamber. According to the present disclosure, the steps of hot break separation and stripping can be brought together spatially. Integration of the two steps in one device provides substantial cost savings and space savings, because only a single device is necessary for the two processes together. As a result of the fact that the outer chamber surrounds the inner chamber, the whirlpool with integrated stripper according to the disclosure can be manufactured in an economical and simple manner. In addition, the heat of the whirlpool, whose chamber walls have a temperature of 90 to 99° C., can be effectively used to evaporate the volatile substances in the outer chamber. The outer chamber furthermore serves as insulation for the inner chamber. Other advantages of the system are furthermore time savings and gentle handling of the sensible medium, wort, as a result of the combination of the process steps in one vessel.

The inner and outer chambers are advantageously arranged concentrically one inside the other. Such a construction is particularly simple and material-saving, because the wall of the inner chamber simultaneously serves as the inner wall for the outer chamber or the outer ring.

According to a preferred embodiment, the whirlpool has a distributor device which introduces wort, which has been transferred from the inner chamber, into the upper region of the outer chamber such that it is distributed over the periphery of the outer chamber. The distributor device advantageously comprises a closed loop that is configured such that the wort is introduced into the outer chamber as a trickling film. When the wort trickles into the outer chamber as a trickling film, this favours the evaporation of the unwanted substances in the wort due to the enlarged surface area.

The distributor device can be a closed loop comprising a plurality of openings distributed across the periphery. The openings can, for example, be arranged in two rows such that they are offset with respect to one another by 90°, each arranged at an angle of 45° to the vertical, in such a way that one row is directed towards the outer wall of the outer chamber and the other row is directed towards the inner wall. It is also possible to configure the closed loop at least partially as an open trickling channel, which in turn can have openings and/or lateral notches. A trickling channel of this kind is very simple to clean.

The inner chamber has a wort feed, which introduces the wort substantially tangentially to the inner chamber wall, the wort feed comprising an inflow element which has a plurality of outlet openings arranged one above the other or a slot for fanning out the wort inflow. This consequently allows the content in the inner chamber to be set into a slight rotating movement by using the whirlpool effect. At the same time, the inflow element is located on the inside of the inner chamber.

It is advantageous if the whirlpool according to the disclosure comprises a cover which covers the inner and outer chambers from above and which has a flue for drawing off the volatile substances.

The wort is advantageously led through the outer chamber with a throughput that is chosen such that the desired cooling takes place within 15 to 30 minutes.

BRIEF DESCRIPTION OF THE DRAWINGS

The present disclosure is explained in more detail in the following with reference to the following figures.

FIG. 4a shows a cross-section through an opened trickling channel.

FIG. 4b shows a cut-out of a top view of the trickling channel shown in FIG. 4a.

FIG. 5a shows a cross-section through another embodiment of a closed loop.

FIG. 5b shows a view from below of the closed loop that is shown in FIG. 5a.

DETAILED DESCRIPTION

Figure 1:
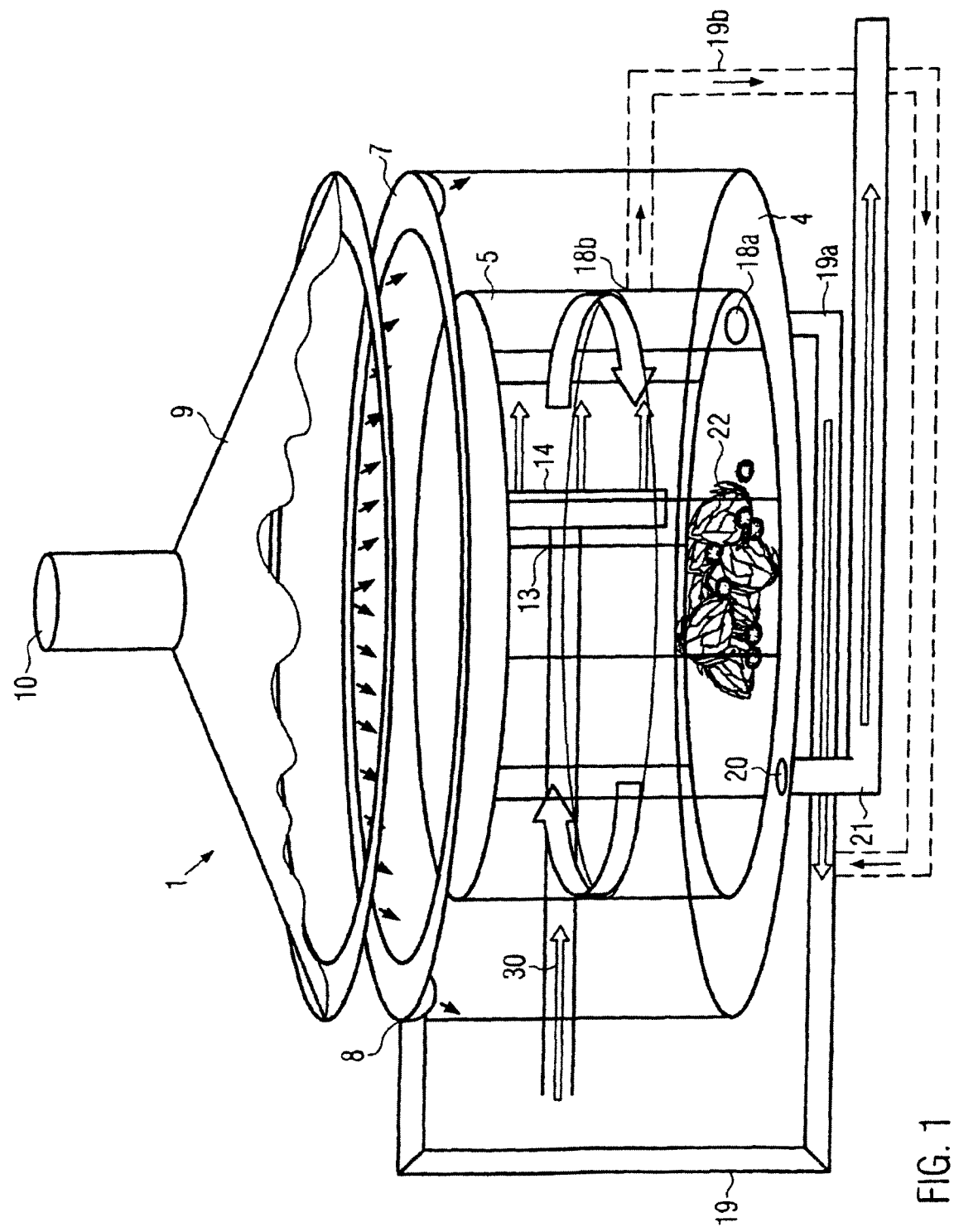
FIG. 1 is a rough schematic depiction of the whirlpool according to the present disclosure.
Figure 2:
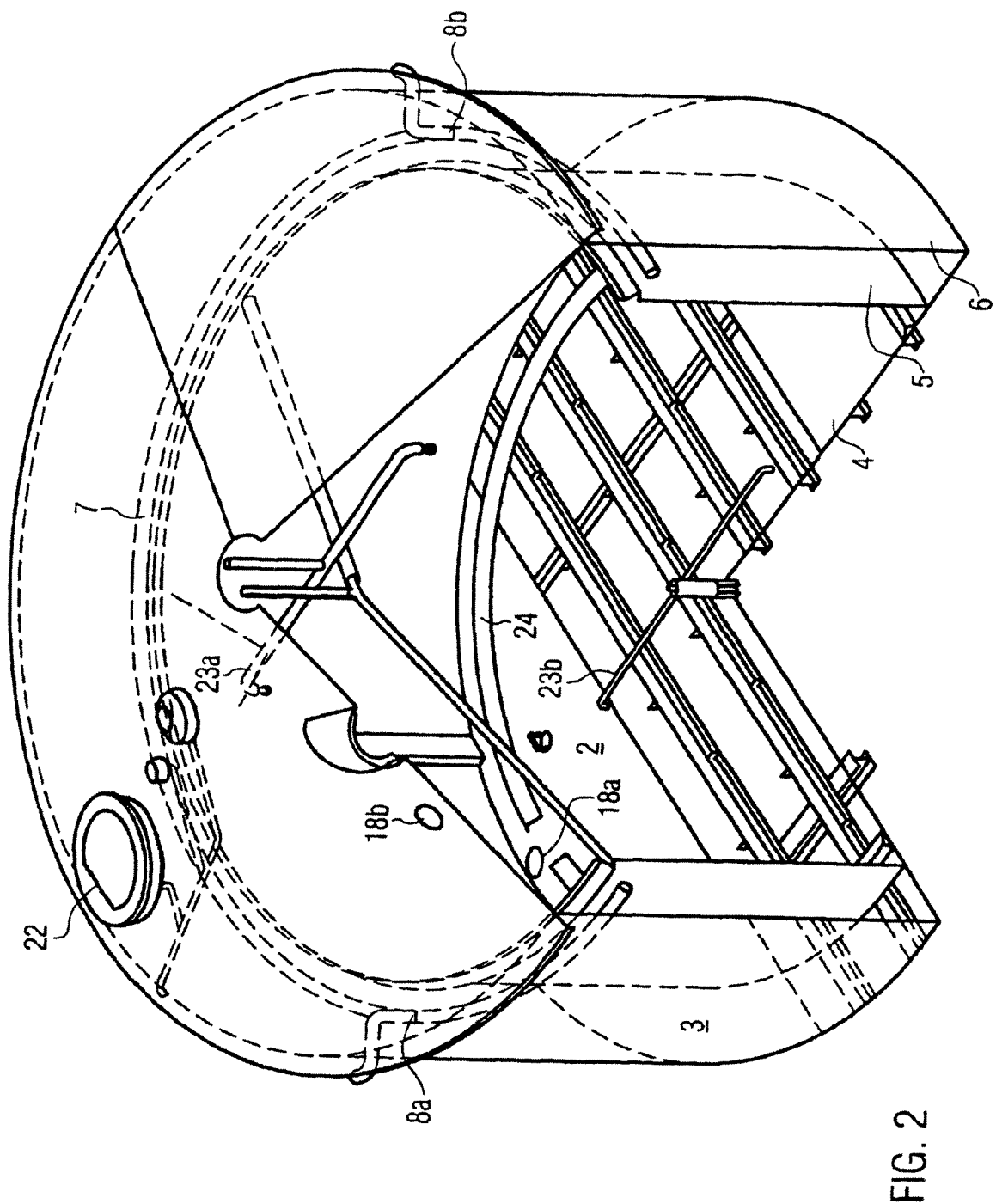
FIG. 2 is a perspective, partially cut open depiction of an embodiment of a whirlpool according to the present disclosure.
Figure 3:
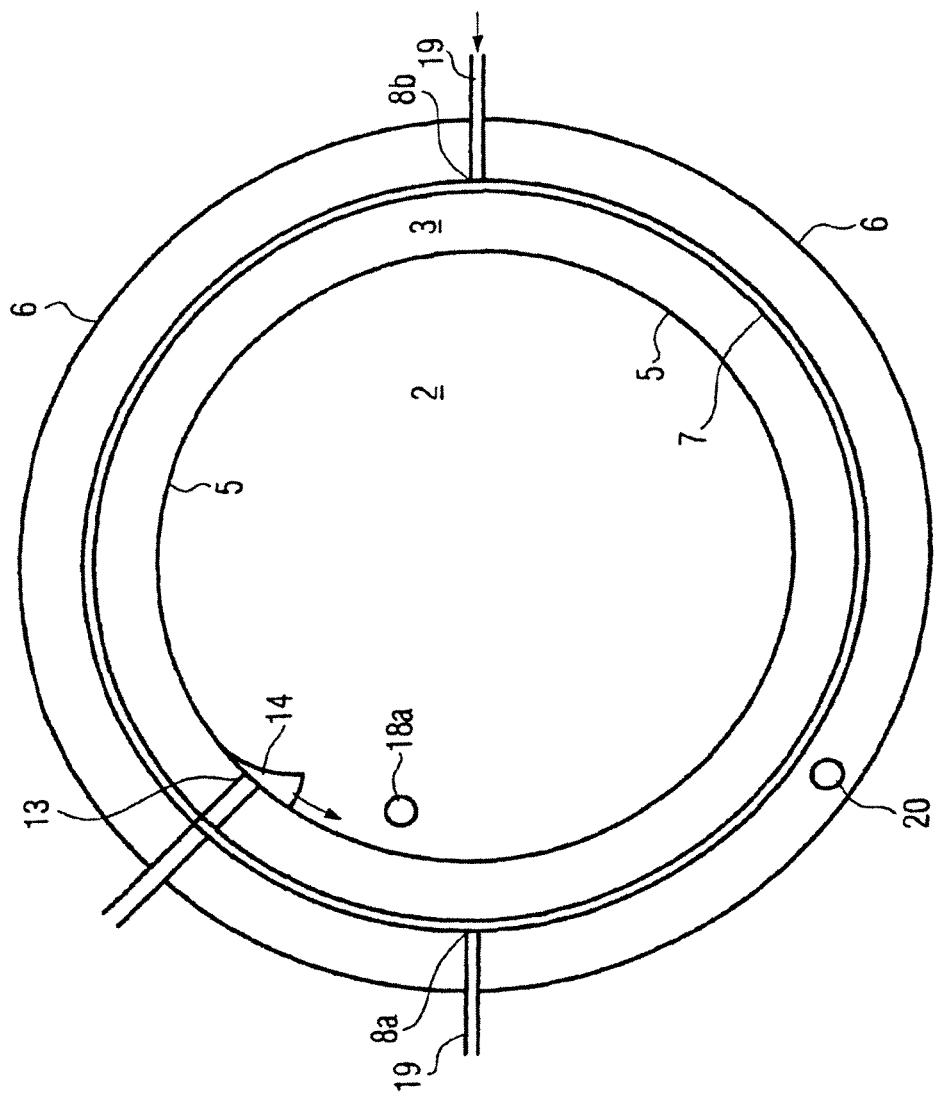
FIG. 3 schematically shows a top view of the essential components of a whirlpool that essentially corresponds to the whirlpool shown in FIG. 2.
Figure 6C:
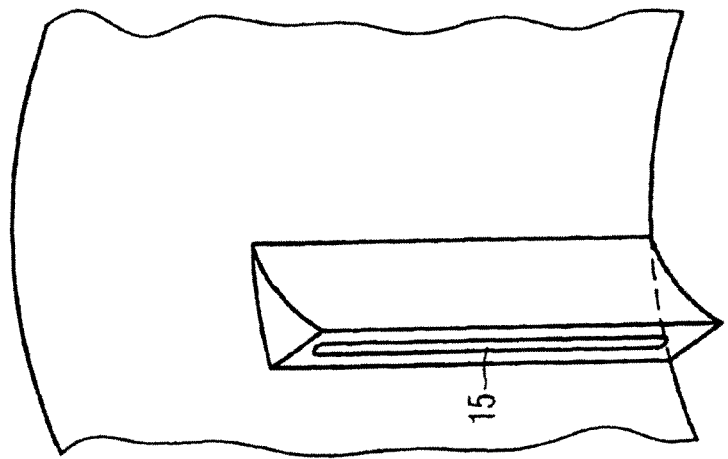
FIG. 6c is a schematic depiction of the inflow element of a wort feed according to a further embodiment.
Figure 6B:
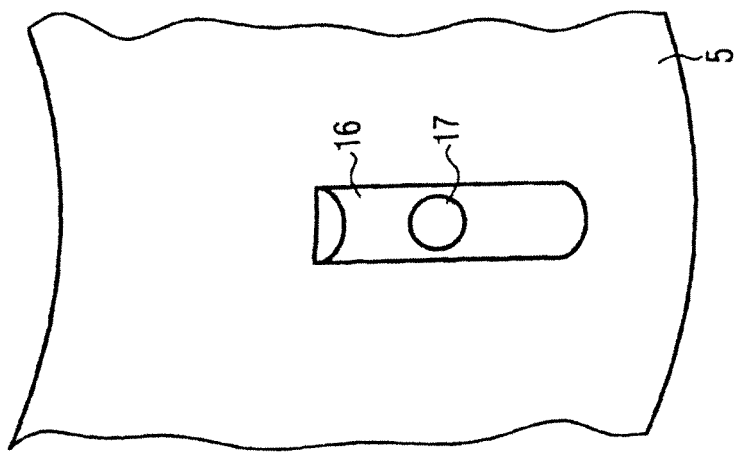
FIG. 6b shows the wort feed on the outer side of the inner chamber.
Figure 6A:
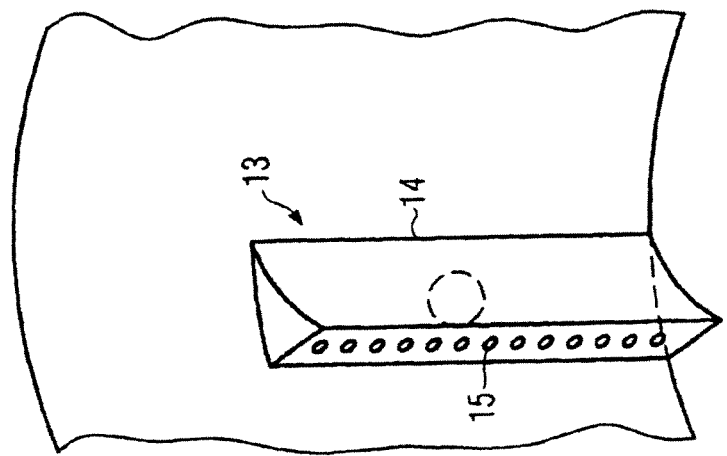
FIG. 6a is a schematic perspective depiction of an inflow element of the wort feed on the inside of the inner chamber.

FIG. 1 shows a schematic depiction of the whirlpool according to the disclosure in the integrated stripper. FIG. 2 is a perspective depiction of a possible embodiment of the stripper according to the disclosure and FIG. 3 shows a top view of such a stripper, whereby only the essential components are shown.

After the boiling of the wort, the cooling, the separation of sludge (also called trub) and the stripping (evaporation off) of the wort are crucially important for the quality of the finished product, beer. As is apparent from FIGS. 1 to 2, the whirlpool according to the disclosure comprises an inner chamber 2, that essentially has the shape of a hollow cylinder and that is bordered by the inner wall 5 and a chamber bottom 4. The diameter of such a chamber can vary from 2 m to 10 m in wide areas, depending on the size of the brewery. The inner chamber 2 is open at the top and serves to separate the hot break by means of a whirlpool effect. The bottom 4 can thereby be slightly tilted (e.g., a 1% to 2% tilt towards the discharge). The wall is preferably formed from stainless steel (chromium/nickel).

The inner chamber 2 has a wort feed 13, via which the wort is tangentially introduced by a wort pump, which is not depicted, so that by using the whirlpool effect, the content of the inner chamber is brought into rotating movement. By using the whirlpool effect, a trub cone 22 forms in the middle of the inner chamber.

According to a preferred embodiment, as can be seen in conjunction with FIGS. 1 to 3 and 6, the wort feed, which introduces the wort substantially tangentially to the inner chamber wall 5, comprises an inflow element 14 that ensures that the wort inflow is fanned out. FIG. 6a shows one possible embodiment of an inflow element of this type, which is located on the interior of the inner chamber 2. As follows from FIG. 6b, a feed pipe 30, not shown in FIG. 6b, for hot wort joins the longish connecting piece 16, which is arranged on the exterior of the inner chamber wall 5. The connecting piece 16 extends in the vertical direction of the whirlpool, so that there can be an even flow to the inflow element 14. The wort feed 13, 14 deflects the wort flow in such a way that it can flow in substantially tangentially to the chamber wall 5. According to this disclosure, the inflow element 14 has a plurality of openings 15 arranged one above the other for making the wort inflow fan out in the vertical direction of the whirlpool. Consequently, the content can be set into a rotating movement in a particularly careful way by using the whirlpool effect. In place of the plurality of openings arranged one above the other, a slit 15 running in the vertical direction of the whirlpool can also be provided in the inflow element 14.

The inner chamber 2 furthermore comprises a discharge 18 in the bottom 4, via which the clarified wort can be drawn off. It is also possible, as depicted by the dashed lines in FIG. 1, that in addition to the discharge 18 in the bottom 4 of the inner chamber 2, a discharge 18b is provided in the upper portion (e.g., in the upper third) of the inner chamber 2, which allows the wort already to be drawn off while sedimentation is still taking place in the lower portion.

In addition to the inner chamber, the whirlpool 1 comprises an outer chamber 3, which is arranged around the inner chamber 2 and which serves as a stripper, for evaporating off unwanted volatile substances from wort transferred from the inner chamber 2. The inner and outer chambers 2, 3 are here arranged concentrically one inside the other, as follows from FIGS. 1 to 3. This means that the wall 5 of the inner chamber 2 here simultaneously represents the inner wall of the outer chamber 3. The outer chamber 3 furthermore has the outer wall 6, which is preferably likewise manufactured from chromium/nickel steel. This means that here the outer chamber 3 is formed in the shape of a ring around the inner chamber. The outer chamber must not, however, inevitably have a round cross-sectional form. The outer chamber furthermore likewise has a chamber bottom 4. The chamber bottoms for the inner and outer chambers are advantageously integrated, as follows from FIG. 2, considerably simplifying the construction. It is, however, also possible for the outer chamber 3 to have a separate bottom. The outer chamber 3 is also open at the top.

The outer chamber 3, which is between 0.4 m and 1 m wide, has at least one infeed 8 for wort from the inner chamber 2. This means that the clarified wort from the inner chamber 2 is drawn off via a corresponding discharge 18a, 18b, and directed into the outer chamber 3 for stripping. In this process, the wort can be pumped out of the inner chamber 2 and into the outer chamber 3 by a corresponding pump. A distributor device 7 is provided in the upper area of the outer chamber 3, whereby this distributor device 7 introduces the wort into the outer chamber 3 such that it is distributed over the periphery of the outer chamber 3. In FIG. 1, the distributor device is arranged at the outer edge area of the chamber 3. The distributor device 7 can, however, likewise be arranged between the inner and outer walls 5, 6, as follows from FIG. 2. The distributor device 7 is preferably, as can be seen in FIG. 2, for example, formed as a closed loop, wherein the closed loop has one or more infeeds 8b, in FIG. 2 two infeeds 8a, 8b, which introduce the wort from the inner chamber into the distributor device, i.e., here the closed loop 7. A plurality of infeeds 8 allows a more even distribution of the wort over the periphery of the outer chamber 3.

The distributor device 7 can be formed in various ways. It is preferably formed in such a way that the wort can be introduced into the outer chamber 3 as a trickling film. In the case of the example shown in FIG. 5a, the closed loop 7 has a tubular cross-section and openings 12 for the discharge of the wort. In this example, the openings are formed as rows of holes 12a and 12b that run offset to one another by 90° and that enclose an angle of 45° with respect to the vertical. The wort that issues from these openings is directed by them diagonally on to the adjacent wall surfaces. It can, however, also be sufficient to provide only one row of holes 12 that are directed downwards, as indicated in FIG. 5b.

It is particularly advantageous if the distributor device 7, as shown in FIGS. 4a and 4b, is formed as a trickling channel 7 that is open at the top. Where appropriate, the trickling channel 7 can have additional openings and/or lateral notches 11 on at least one side. The wort that is directed into the trickling channel 7 then splashes over the edges of the trickling channel, consequently producing the corresponding trickling film. Such a trickling channel is particularly simple to clean. By forming a trickling film, evaporation of the wort is assisted due to the enlarged surface area. Because of the hot wort in the inner chamber 2, the inner wall 5 is heated so that it has a temperature in a range from 90 to 99° C. Unwanted volatile substances can consequently evaporate out of the wort that flows away from the distributor device 7. Wort can be drawn off from the outer chamber 3 via the discharge 20 by a pump, which is not shown, and, for example, fed to a cooler.

Arranged on the chambers is a cover 9, which covers both the inner and the outer chambers 2, 3, which are open at the top. The cover is, in turn, preferably made of chromium/nickel steel, and furthermore has a flue 10, through which the volatile substances that have been evaporated off can be drawn off. As can be seen in FIG. 2, the cover 9 can be provided with an inspection window 22. As further follows from FIG. 2, the whirlpool has a plurality of spraying devices 23a, 23b in a known manner, whereby these spraying devices serve the cleaning of the inner chamber 2. The outer chamber can also have spray heads, which are not shown in more detail, for cleaning purposes. The supply lines for the spraying devices 23a, 23b are effected via the flue opening. The bottom 4 of the inner chamber 2 further comprises a boundary 24, which ensures that the sludge does not reach the area of the discharge opening 18.

The ratio of the diameter of the inner chamber to the diameter of the outer chamber lies in a range between 0.65 and 0.95. Valves, which are not shown, can be provided in the lines 19a and 19b, whereby these valves regulate the flow of the wort into the outer chamber 3. The outer wall 6 is higher than the inner wall 5 in the case of this embodiment.

The whirlpool with integrated stripper according to the disclosure consequently allows hot break separation and stripping in just a single device.

In the following, the method for hot break separation and for stripping unwanted volatile substances during the brewhouse process is described. In the method according to the disclosure, to manufacture the wont for beer brewing, pumping is in the direction of the arrow, as shown in FIG. 1, out of a wort copper (not shown) through a wort pump (likewise not shown) into the line 30, until the wort has reached the wort feed 13 to the inner chamber 2. The wort is diverted over the wort feed 13, 14 in such a way that it is introduced to the inner container wall 5 tangentially. The wort inflow is fanned out in the vertical direction of the whirlpool 1 by the inflow element 14 on the interior of the inner wall 5. The liquid in the inner chamber 2 rotates in the chamber as indicated by the arrows due to the fact that the wort flows on to the inner wall in such a way that the wont moves along the wall. By using the whirlpool effect, the content of the inner chamber 2 is consequently carefully set into a slightly rotating movement. As a result of the whirlpool effect, a so-called trub cone deposits in the middle of the bottom 4 of the inner chamber 2.

After a particular quantity of wont has run into the inner chamber 2, there is a rest time of roughly 15 to 30 minutes, during which further sedimentation of the trub particles in the wort takes place. Even during the sedimentation process, it is already possible to draw off wont in the upper portion, for example, via the discharge 18, while sedimentation is still going on in the lower portion. After the rest time, the wort is drawn off via the lower discharge 18 in the bottom 4 of the inner chamber 2. The wort can be drawn off by a pump, which is not depicted.

The wort drawn off from the inner chamber 2 is then introduced into the outer chamber 3, i.e., in this case, the outer ring 7, via one or more corresponding lines 19a, 19b in order to evaporate unwanted volatile substances, such as DMS, for example, out of the wort. For this purpose, the wort is fed to a distributor device 7 via at least one wort infeed 8a, b, whereby this distributor device 7 introduces the wort into the outer chamber 3 from the top such that it is distributed uniformly over the periphery of the outer chamber 3. The distributor device is preferably formed in such a way that it forms a trickling film. The throughput of the wort that is introduced into the outer chamber 3 is chosen such that the full wort cooling that is striven for can take place within 30 to 60 minutes.

The wort, which is slowly trickling down in virtually a thin film, has an enlarged surface area, which makes possible and assists the evaporation of unwanted volatile substances. The evaporation is even further assisted by the heat of the inner wall 5, which is heated by the hot wort to 90 to 99° C. The volatile substances rise up and can be taken off through the flue 10 of the cover 9, which is located on the chambers 2, 3. The stripped wort can be drawn off via the discharge 20 in the direction of the arrow (see FIG. 1) and, for example, be fed to a cooler, e.g., a plate cooler, via a pump. Naturally it is possible to provide a corresponding valve in the drain 21, whereby this valve opens or closes the discharge. Due to the combination of hot break separation and stripping in one device, it is possible to save both money and space. Further advantages of the system include time reductions and careful handling of the sensible medium, wort.

The invention claimed is:

1. Whirlpool apparatus for brewing operations, comprising an inner chamber constructed to separate hot break by means of a whirlpool effect, wherein the inner chamber has a wort feed via which the wort is tangentially introduced so that by using the whirlpool effect, rotating movement is imparted to the contents of the inner chamber, said inner chamber having essentially the shape of a hollow cylinder and being bordered by an inner wall and a bottom, and an integrated stripper comprising an outer chamber arranged around the inner chamber for evaporating off volatile substances from wort transferred from the inner chamber, said apparatus further comprising a pump for pumping the wort out of the inner chamber into the outer chamber and a distributor device that introduces wort which has been transferred from the inner chamber into an upper area of the outer chamber such that the wort is distributed over a periphery of the outer chamber said distributor device being disposed one of (a) between the inner wall of the outer chamber and the outer wall of the inner chamber, and (b) at an outer edge of the outer chamber, and wherein the distributor device comprises a closed loop which is configured such that the wort is introduced into the outer chamber as a trickling film.

2. Whirlpool apparatus according to claim 1, wherein the inner and outer chambers are arranged concentrically, one inside the other.

3. Whirlpool apparatus according to claim 1, wherein the closed loop is formed at least partially as an open trickling channel.

4. Whirlpool apparatus according to claim 3, wherein the trickling channel comprises one of openings, lateral notches, and combinations thereof.

5. Whirlpool apparatus according to claim 1, wherein the wort feed having an inflow element which has a plurality of outlet openings, arranged as one of one above the other or as a slot for fanning out the inflow.

6. Whirlpool apparatus according to claim 5, wherein the inflow element is arranged on the inner side of the inner chamber.

7. Whirlpool apparatus according to claim 1, wherein the whirlpool comprises a cover, which covers the inner and outer chambers from above and which has a flue to draw off the volatile substances.

* * * * *